3,214,475
STABILIZED FORMALDEHYDE SOLUTIONS
George N. Butter, Terre Haute, Ind., assignor to Commercial Solvents Corporation, New York, N.Y., a corporation of Maryland
No Drawing. Filed Mar. 5, 1962, Ser. No. 177,164
15 Claims. (Cl. 260—606)

My invention relates to stabilized formaldehyde solutions. More particularly, my invention relates to formaldehyde solutions stabilized against excessive polymerization and to a method for stabilizing formaldehyde solutions.

Formaldehyde, a product used in large quantities in the chemical industry, is generally transported as a 35–50% aqueous solution. Transportation of such solutions, however, is aggrevated by the tendency of formaldehyde to polymerize and then settle out as a polymerized solid from the solution. Polymerization and concurrent deposition increase with decrease in temperature. Thus, during the cold seasons transportation of concentrated formaldehyde solutions becomes impractical.

Various procedures have been attempted to minimize polymerization and solid deposition in formaldehyde solutions. For example, very low concentrations of formaldehyde in the solution on the order of 5–10% can be transported even in cold weather without excessive polymerization and deposition. However, since water is the main component, this method is practical only when small amounts of formaldehyde are transported. Also, various preservatives such as methanol, when incorporated in amounts of about 5–20% into the formaldehyde solution, have demonstrated ability to impede polymerization even when used with concentrations of formaldehyde as high as 35–50%. The addition of such large amounts of methanol, however, not only is costly but necessitates separation of the methanol from the formaldehyde solution before use can be made of the formaldehyde. More recently it has been found that small amounts of hydroxylamine hydrochloride impede but do not completely prevent polymerization of formaldehyde and deposition from the aqueous solution of the solid polymerized material even under low temperature conditions. However, the difficulty in using hydroxylamine hydrochloride is that the material which does polymerize and settle as a solid deposit from the formaldehyde solution on subjection to lower temperature does not return to solution with a subsequent rise in temperature thus resulting not only in loss of material but necessitating the separation of the polymerized solid material from the formaldehyde solution.

I have now discovered a means whereby formaldehyde solutions of industrial concentrations can be substantially preserved against polymerization and deposition of solid material even when subjected to temperatures at which uninhibited formaldehyde solutions deposit substantial amounts of polymerized formaldehyde. More important, however, my invention permits ready resolution of polymerized formaldehyde which has been deposited at low temperatures merely by slightly raising the temperature of the solution.

Generally my invention involves addition of polymerization retarding amounts of amides having the following general formula to formaldehyde solutions:

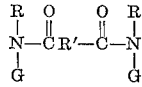

wherein R is a lower alkyl radical, wherein R' is an alkylene radical containing at least 6 carbon atoms, and wherein G is the radical of a glycitol, or in other words, a glycityl radical having at least 5 carbon atoms. These amides can be prepared by the condensation of a diacid containing not less than 7 carbon atoms with a glycamine having the following general formula:

wherein R and G are defined as above utilizing molar ratios of glycamine to diacid of not less than 2 to 1 respectively. Such diacids which can be used in preparing my inhibitors include suberic acid, azelaic acid, sebacic acid, brassylic acid, thapsic acid, tricontanedioic acid, etc., and the like. Such glycamines which can be utilized in preparing my new compounds include N-methyl glucamine, N-butyl glucamine, N-isopropyl glucamine, N-methyl fructamine, N-methyl galactamine, N-methyl arabamine, etc., and the like.

Included among the inhibitors of my invention are bis-(N-methylglucatyl)suberylamide, bis-(N-methylglucatyl)azelylamide, bis-(N-methylglucatyl)sebacylamide, bis-(N-methylglucatyl)-brassylylamide, bis-(N-methylglucatyl)thapsylamide, bis-(N-methylglucatyl)tricontanediylamide, bis-(N-isopropylglucatyl)azelylamide, bis-(N-methylfructatyl)azelylamide, bis-(N-methylgalactatyl)azelylamide, etc., and the like.

In carrying out my improved process, I have found that when amounts as low as 5 p.p.m. and as high as 500 p.p.m. by weight of my inhibitors based on the weight of the formaldehyde solution are incorporated in the formaldehyde solution, suitable results can be obtained. However, to obtain optimum results I usually prefer to utilize from about 25 to about 250 p.p.m. of my inhibitors.

The following examples serve to illustrate my invention, but it is not intended that my invention be limited to the procedure or specific materials set forth therein.

*Example I*

To a 1,000 ml. portion of 44% formaldehyde solution containing 1% methanol was added 1.25 ml. of a methanol solution containing bis - (N - methylglucatyl)azelylamide to give a formaldehyde solution containing 50 p.p.m. of bis-(N-methylglucatyl)azelylamide. The thus treated solution and a 1,000 ml. portion of 44% formaldehyde containing 1% methanol but no bis-(N-methylglucatyl)azelylamide were heated to about 100° F. and maintained at that temperature for 30 days. At the end of the 30-day period, the two portions were observed. The first portion containing the inhibitor showed only a small amount of solid deposition while the second portion containing no inhibitor was quite cloudy and showed a great deal of solid deposition. The temperatures of the two portions were then lowered to 60° F. and solid deposition occurred in each portion. The two portions were then heated to 120° F. with accompanying agitation. The solid material in the inhibited portion was observed to have substantially disappeared while the solid material in the portion not treated with the inhibitor was observed to be substantially unchanged.

*Example II*

The procedure of Example I was followed except that bis-(N-methylglucatyl)suberylamide was utilized instead of bis-(N-methylglucatyl)azelylamide.

*Example III*

The procedure of Example I was followed except that bis-(N-methylglucatyl)sebacylamide was utilized instead of bis-(N-methylglucatyl)azelylamide. Results similar to those of Example I were obtained.

Example IV

The procedure of Example I was followed except that bis-(N-methylglucatyl)brassylylamide was utilized instead of bis-(N-methylglucatyl)azelylamide. Results similar to those of Example I were obtained.

Example V

The procedure of Example I was followed except that bis-(N-methylglucatyl)thapsylamide was utilized instead of bis-(N-methylglucatyl)azelylamide. Results similar to those of Example I were obtained.

Example VI

The procedure of Example I was followed except that bis-(N-methylglucatyl)tricontanediylamide was utilized instead of bis-(N-methylglucatyl)azelylamide. Results similar to those of Example 1 were obtained.

Example VII

The procedure of Example I was followed with the exception that bis-(N-isopropylglucatyl)azelylamide was utilized instead of bis-(N-methylglucatyl)azelylamide. Results similar to those of Example I were obtained.

Example VIII

The procedure of Example I was followed with the exception that bis-(N-butylglucatyl)azelylamide was utilized instead of bis - (N - methylglucatyl)azelylamide. Results similar to those of Example I were obtained.

Example IX

The procedure of Example I was followed with the exception that bis-(N-methylfructatyl)azelylamide was utilized instead of bis-(N-methylglucatyl)azelylamide. Results similar to those of Example I were obtained.

Example X

The procedure of Example I was followed except that bis-(N-methylgalactatyl)azelylamide was utilized instead of bis-(N-methylglucatyl)azelylamide. Results similar to those of Example I were obtained.

Now having described my invention, what I claim is:

1. An aqueous formaldehyde solution comprising aqueous formaldehyde and a sufficient amount of an amide having the following general formula:

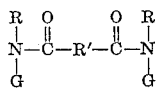

wherein R is a lower alkyl radical, wherein R' is an alkylene radical having at least 6 carbon atoms and wherein G is a glycityl radical having at least 5 carbon atoms, to stabilize said solution against deposition of solid material from the solution.

2. An aqueous formaldehyde solution comprising aqueous formaldehyde and a sufficient amount of bis-(N-methylglucatyl)azelylamide to stabilize said solution against deposition of polymerized formaldehyde from the solution.

3. An aqueous formaldehyde solution comprising aqueous formaldehyde and a sufficient amount of bis-(N-methylglucatyl)suberylamide to stabilize said solution against deposition of polymerized formaldehyde from the solution.

4. An aqueous formaldehyde solution comprising aqueous formaldehyde and a sufficient amount of bis-(N-methylglucatyl)sebacylamide to stabilize said solution against deposition of polymerized formaldehyde from the solution.

5. An aqueous formaldehyde solution comprising aqueous formaldehyde and a sufficient amount of bis-(N-methylglucatyl)brassylylamide to stabilize said solution against deposition of polymerized formaldehyde from the solution.

6. An aqueous formaldehyde solution comprising aqueous formaldehyde and a sufficient amount of bis-(N-methylglucatyl)thapsylamide to stabilize said solution against deposition of polymerized formaldehyde from the solution.

7. An aqueous formaldehyde solution comprising aqueous formaldehyde and a sufficient amount of bis-(N-methylglucatyl)tricontanediylamide to stabilize said solution against deposition of polymerized formaldehyde from the solution.

8. An aqueous formaldehyde solution comprising aqueous formaldehyde and a sufficient amount of bis-(N-isopropylglucatyl)azelylamide to stabilize said solution against deposition of polymerized formaldehyde from the solution.

9. An aqueous formaldehyde solution comprising aqueous formaldehyde and a sufficient amount of bis-(N-butylglucatyl)azelylamide to stabilize said solution against deposition of polymerized formaldehyde from the solution.

10. An aqueous formaldehyde solution comprising aqueous formaldehyde and a sufficient amount of bis-(N-methylfructatyl)azelylamide to stabilize said solution against deposition of polymerized formaldehyde from the solution.

11. An aqueous formaldehyde solution comprising aqueous formaldehyde and a sufficient amount of bis-(N-methylgalactatyl)azelylamide to stabilize said solution against deposition of polymerized formaldehyde from the solution.

12. An aqueous formaldehyde solution comprising aqueous formaldehyde and from about 5 p.p.m. to about 500 p.p.m. of a compound having the following general formula:

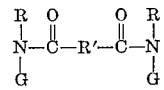

wherein R is a lower alkyl radical, wherein R' is an alkylene radical having at least 6 carbon atoms, and wherein G is a glycityl radical having at least 5 carbon atoms.

13. An aqueous formaldehyde solution comprising aqueous formaldehyde and from about 25 to about 250 p.p.m. of a compound having the following general formula:

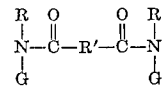

wherein R is a lower alkyl radical, wherein R' is an alkylene radical having not less than 6 carbon atoms, and wherein G is a glycityl radical having at least 5 carbon atoms.

14. The solution of claim 1 wherein G in the general formula is a glycityl radical of 5 to 6 carbon atoms and R' is an alkylene radical having 6 to 30 carbon atoms.

15. The solution of claim 1 wherein the aqueous formaldehyde solution is 44% formaldehyde.

References Cited by the Examiner
UNITED STATES PATENTS

| | | | |
|---|---|---|---|
| 2,000,152 | 5/35 | Walker | 260—606 |
| 3,137,736 | 6/64 | Prinz et al. | 260—606 |

LEON ZITVER, *Primary Examiner.*